(12) United States Patent
Comeau

(10) Patent No.: US 9,221,339 B2
(45) Date of Patent: Dec. 29, 2015

(54) MOTION SENSITIVE INTERLOCK FOR A VEHICLE HAVING A BREATH ANALYZER

(71) Applicant: Felix J. E. Comeau, Toronto (CA)

(72) Inventor: Felix J. E. Comeau, Toronto (CA)

(73) Assignee: ALCOHOL COUNTERMEASURE SYSTEMS (INTERNATIONAL) INC. (CA)

( * ) Notice: Subject to any disclaimer, the term of this patent is extended or adjusted under 35 U.S.C. 154(b) by 42 days.

(21) Appl. No.: 14/164,677

(22) Filed: Jan. 27, 2014

(65) Prior Publication Data

US 2014/0138175 A1    May 22, 2014

Related U.S. Application Data

(63) Continuation of application No. 13/025,671, filed on Feb. 11, 2011, now Pat. No. 8,648,728.

(60) Provisional application No. 61/303,336, filed on Feb. 11, 2010.

(51) Int. Cl.
*G08B 21/00* (2006.01)
*B60K 28/06* (2006.01)

(52) U.S. Cl.
CPC ............. *B60K 28/063* (2013.01); *B60K 28/066* (2013.01); *B60W 2540/24* (2013.01)

(58) Field of Classification Search
CPC .................................................. B60W 2540/24
USPC ....................... 340/573.1, 576; 180/272, 279; 307/10.1, 10.6; 600/532
See application file for complete search history.

(56) References Cited

U.S. PATENT DOCUMENTS

2006/0202842 A1*  9/2006  Sofer ............................ 340/576
2006/0237254 A1* 10/2006  Mobley et al. ................ 180/272

* cited by examiner

*Primary Examiner* — Jeffery Hofsass
(74) *Attorney, Agent, or Firm* — Dickinson Wright PLLC

(57) ABSTRACT

Apparatus for use with a vehicle is disclosed and comprises an interlock device. The device is adapted to, in use: at least while said vehicle is in motion, periodically generate a prompt; assess motion of said vehicle; at least when said vehicle is assessed by said device to be at rest, carry out an analysis operation wherein a breath sample is received and analyzed; and in the event that, within a predetermined period following a prompt, the device does not, while said vehicle is assessed to be at rest, carry out said analysis operation, enter an alarm state at least when the vehicle is in motion. The device can be adapted to carry out analysis operations only when the vehicle is assessed to be at rest.

14 Claims, 2 Drawing Sheets

MOTION SENSITIVE INTERLOCK FOR A VEHICLE HAVING A BREATH ANALYZER

CROSS-REFERENCE TO RELATED APPLICATIONS

Figure 1:
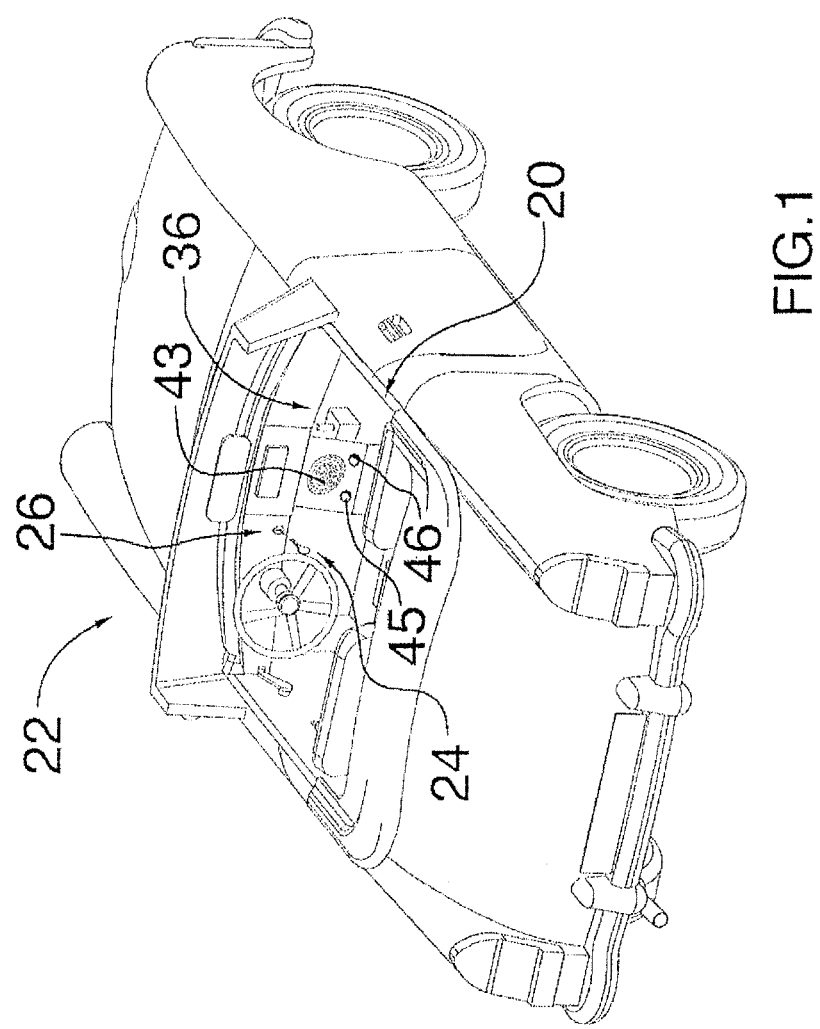

The present application is a continuation of U.S. patent application Ser. No. 13/025,671, filed 11 Feb. 2011, and through which priority is claimed to U.S. Provisional Application 61/303,336, filed 11 Feb. 2010, the disclosures of which are incorporated herein by reference in their entireties.

FIELD OF THE INVENTION

The present invention relates to the field of automotive interlocks.

BACKGROUND OF THE INVENTION

It is well-known to secure a motor vehicle against operation by a person who has consumed alcohol by installing in said vehicle a breath alcohol tester. A typical arrangement, known as an ignition interlock device (IID), involves a relay between the breath tester and the starter motor, pursuant to which the starter motor cannot be engaged until a satisfactory breath sample has been given. In this regard, a 'satisfactory' gas sample is conventionally understood to be one that (i) is of sufficient volume and pressure to permit alcohol analysis; (ii) has alcohol concentration below a predetermined limit; and (iii) appears to have originated from the exhaled breath of a human being. Criteria (iii) is often assessed through measurements of pressure, humidity and temperature, but various other techniques such as hum recognition sensors are occasionally used. In some jurisdictions, a person convicted of driving under the influence of alcohol may be required by law to have a device of this type installed as a condition associated with the extension of driving privileges. While the engine is running, the IID will randomly require the driver to provide another breath sample. The time between required breath samples is dependent on the setting of the unit but it is typical for random breath samples to be required every 10 to 20 minutes while the vehicle is in operation. The purpose behind the random breath sample is to prevent a driver from having a "sober" friend blow into the device to start the vehicle and to deter drinking while driving. If the requested breath sample is not provided or exceeds the predetermined limit, the device will record the incident, warn the driver and then start up an alarm (e.g., lights flashing, horn honking, etc.) until the ignition is turned off or a satisfactory breath sample has been provided.

SUMMARY OF THE INVENTION

Apparatus for use with a motor vehicle forms one aspect of the present invention. This apparatus comprises: an interlock device, the interlock device being adapted to, in use: at least while said vehicle is in motion, periodically generate a prompt; assess motion of said vehicle; at least when said vehicle is assessed by said device to be at rest, carry out an analysis operation wherein a breath sample is received and analyzed; and in the event that, within a predetermined period following a prompt, the device does not, while said vehicle is assessed to be at rest, carry out said analysis operation, enter an alarm state in which one or more of the following are actuated at least when the vehicle is in motion: lighting forming part of the vehicle; auxiliary lighting carried by the vehicle; the horn of the vehicle; auxiliary horn carried by the vehicle; an event recording circuit; and an immobilizer circuit.

According to another aspect of the invention, the device can be adapted to carry out analysis operations only when the vehicle is assessed to be at rest.

According to another aspect of the invention, when in use with a vehicle having an internal combustion engine, the device can be adapted to block the engine against starting except within: a predetermined period following an analysis operation which has resulted in a finding of breath alcohol concentration below a predetermined limit; and a predetermined period following an engine stall.

According to another aspect of the invention, wherein, following an analysis operation, which has resulted in a finding of breath alcohol concentration at or above the predetermined limit, the alarm state can be entered.

According to another aspect of the invention, when in use with an electric vehicle that is user-selectable between an operable state in which the vehicle is capable of being put into motor-driven motion and an inoperable state in which the vehicle is incapable of being put into motor-driven motion, the device can be adapted, on entry into the operable state from the inoperable state, to block motor-driven motion of the vehicle otherwise than in a predetermined period following an analysis operation which has resulted in a finding of breath alcohol concentration below a predetermined limit.

According to another aspect of the invention, wherein, following an analysis operation, which has resulted in a finding of breath alcohol concentration at or above the predetermined limit, the alarm state can be entered.

According to another aspect of the invention, the analysis operation can result in a finding of breath alcohol below the predetermined limit only when the gas sample is determined by the device to originate from human breath.

According to another aspect of the invention, the determination of human breath origin can be based on one or more of: a hum sensor; a measurement of humidity; a measurement of pressure; a measurement of temperature; and a measurement of volume.

According to another aspect of the invention, the interlock device can assess motion of said vehicle in use via one or more of: the on-board diagnostic system of the vehicle; a speedometer of the vehicle; a GPS device; an internal accelerometer; an inertia sensor; cellular telephonic signal triangulation; an odometer of the vehicle; the vehicle speed sensor; an earth gravitational sensor; and a park sensor of the vehicle.

According to another aspect of the invention, the event recording circuit can be actuated in the event of receipt of a gas sample which is determined to have an alcohol concentration at or above a predetermined limit.

According to another aspect of the invention, the immobilizer circuit, when activated, can cause: the maximum attainable motor-driven velocity of the vehicle to decrease over time; and/or the maximum attainable motor-driven velocity of the vehicle to decrease to nil if the vehicle is assessed to have been at rest for more than a predetermined period of time.

According to another aspect of the invention, the rate of decrease of the maximum attainable motor-driven velocity of the vehicle can be a function of vehicle location and/or vehicle speed.

According to another aspect of the invention, the immobilizer circuit can be activated in the event that, within a predetermined period of time following the prompt, the gas sampler does not receive and analyze a gas sample, the predetermined period of time being a function of vehicle location and/or speed.

According to another aspect of the invention, the event recording circuit can (i) record the date and time at which the alarm state was entered; and/or (ii) send, by wireless means, a message outlining the date and time at which the alarm state was entered.

According to another aspect of the invention, when in use with a vehicle having a combustion engine, said periodic prompt generation can occur during times when the engine is running.

According to another aspect of the invention, when in use with an electric vehicle that is user-selectable between an operable state in which the vehicle is capable of being put into motion and an inoperable state in which the vehicle is incapable of being put into motion, said periodic prompt generation can occur during times when the vehicle is in the operable state.

According to another aspect of the invention, the immobilizer circuit can be activated when the vehicle is in the alarm state.

According to another aspect of the invention, the periodic generation of the prompt may be suppressed while the vehicle is assessed to be at rest.

Other advantages, features and characteristics of the method, will become more apparent upon consideration of the following detailed description and the appended claims.

Figure 2:
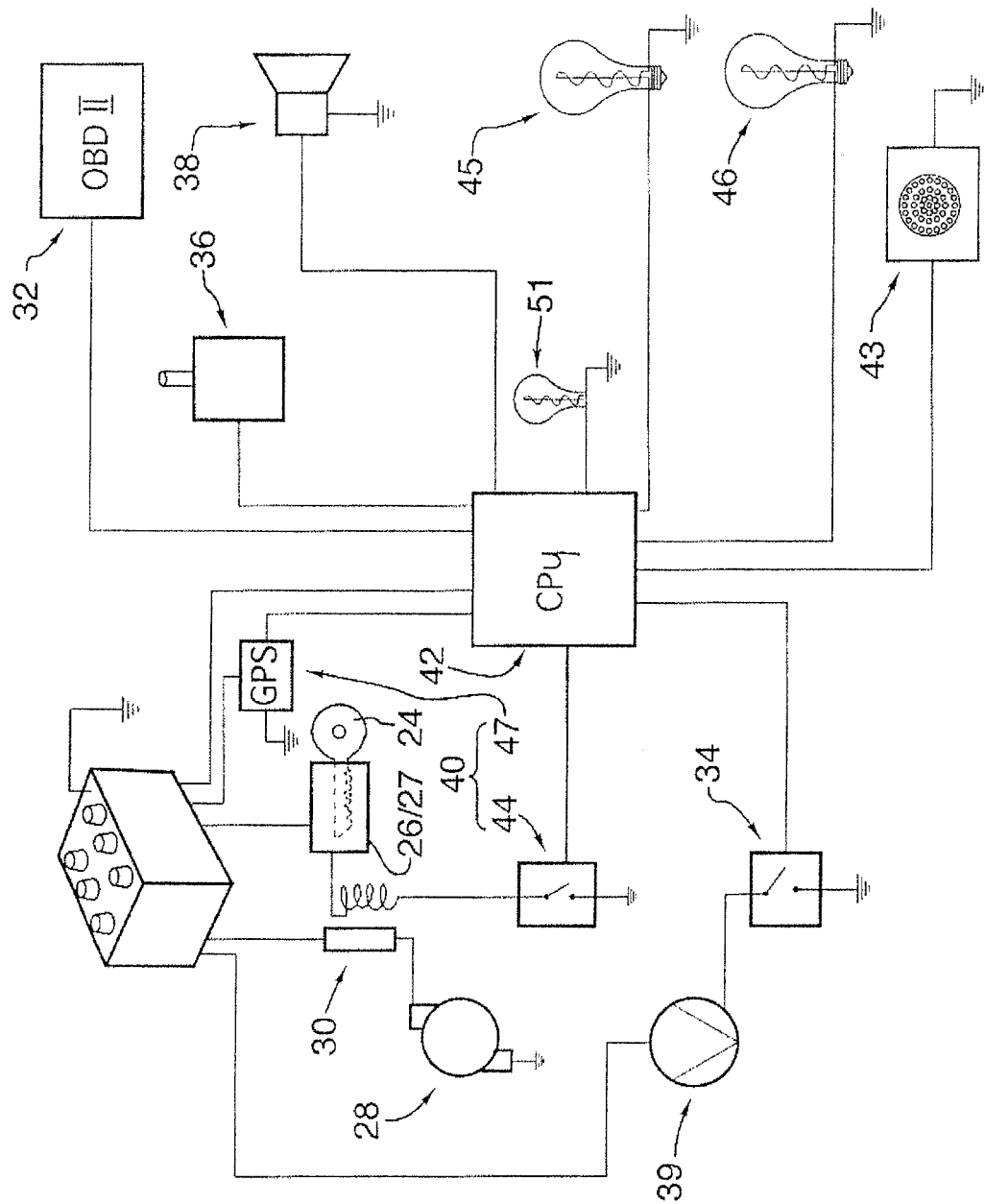

FIG. 1 is a view of an interlock according to an exemplary embodiment of the invention in use with a vehicle; and FIG. 2 is a schematic view of the interlock of FIG. 1 in combination with germane systems of the vehicle.

DETAILED DESCRIPTION OF THE EXEMPLARY EMBODIMENT

An interlock device 20 according to an exemplary embodiment of the present invention is hereinafter described with reference to FIG. 1 and FIG. 2 but, as an initial matter, it will be understood that the exemplary interlock device 20 is for use with a motor vehicle 22.

This motor vehicle 22 is of a conventional type which is user-selectable between an operable state in which the vehicle is capable of being put into motion by its motor and an inoperable state in which the vehicle is incapable of being put into motion by its motor. The user-selection is accommodated by way of a mechanical key 24 that the user inserts in a tumbler 26 arrangement; a partial turn activates the ignition circuit 27 and a full turn activates the starter motor 28 of the vehicle, through actuation of a starter solenoid 30. The nil-turn position corresponds to the inoperable state; both partial and full-turn positions correspond to the operable state. The vehicle 22 is also of the type including an OBD-II compliant On-Board Diagnostics System 32 that generates signals including vehicle speed and vehicular operational state and is also of the type having an immobilizer circuit 34 for interfering with motion of the vehicle, for example, a switch in the circuit powering the fuel pump 39.

Turning now to the exemplary interlock device 20, same should be understood to comprise a gas sampler 36, a siren 38, a controller 40, a tone generator 43, a prompt light 45, a warning light 46 and a fail light 51.

The gas sampler 36 is of the fuel cell sensor type adapted to receive and analyze a gas sample and produce a signal that varies in a predictable manner with alcohol concentration in the gas sample. The sampler 36 is also of the type adapted to test the gas sample for pressure, temperature, flow, humidity and volume. On completion of an analysis, the gas sampler 36 produces signals which are indicative of the analyses. The siren 38 is mounted in use in the engine compartment.

The controller 40 includes a computing device 42, a relay 44 and a GPS device 47.

The relay 44, in use, is interposed in the circuit powering the starter solenoid 30.

The computing device 42: is for receiving the signals produced by and actuating the gas sampler 36; is coupled to the relay 44, for actuation thereof; in use, is coupled to and receives signals from OBD-II circuit; in use, is coupled to the immobilizer circuit 34; is coupled to the GPS device 47; and has the following functions:

| prompt generation | enablement |
| gas sampler actuation | alarm |
| analysis | reset |

Prompt Generation

While the vehicle is in an operable state [i.e. in the described embodiment, this being when the ignition switch is either in the partially-turned or fully-turned position] the computing device 42 periodically generates a prompt, which is audibly and visually signaled to the operator of the vehicle through actuation of the tone generator 43 and prompt light 45.

The period between prompts is a random period that depends on the number of prompts that have occurred since the vehicle last entered an operable state; the random period preceding each prompt is relatively short in comparison to the random period between that prompt and the next prompt.

The random period is obtained through a random number generator and a timer which form part of the computing device 42. The tone generator 43 and prompt light 45 are adapted to vary in intensity as a function of the location of the vehicle [as determined by the GPS] and the time elapsed and distance driven since the issuance of the prompt. For example, in a heavily populated area, where a driver can spend a relatively long time travelling a relatively short distance while encountering a relatively large number of pedestrians and other drivers, the intensity increases relatively rapidly and substantially in direct relation to elapsed time. In a lightly populated area, such as a logging trail, where a driver can, in a relatively short period of time, travel only a relatively short distance and encounter relatively few pedestrians and other drivers, the intensity increases relatively slowly and is biased towards distance traveled. Where the information made available by the GPS device suggests the vehicle is travelling on a highway lacking shoulders, the intensity increases relatively slowly until the vehicle approaches an exit, whereupon the intensity increases relatively quickly. Where the information made available by the GPS device suggests the vehicle is at rest and has been at rest for some time, such as would be the case with a commercial vehicle at a rest stop, the intensity is maintained at a low level until the vehicle is put into motion. The tone generator 43 and prompt light 45 are deactivated on receipt of a gas sample, as discussed below.

Gas Sampler Actuation

When a prompt is issued, the computing device 42 assesses motion of the vehicle and, when the vehicle is determined to be at rest, based on readings from the OBD-II circuit, actuates the gas sampler 36 for receiving and analyzing any gas sample introduced thereinto [and producing signals indicative of the analyses as aforesaid]. The gas sampler 36 can also be actuated manually, when the vehicle is at rest.

Analysis

The computing device 42 receives the signals from the gas sampler 36 and determines:
- if the readings from the gas sampler 36 are indicative of an alcohol concentration at or in excess of a predetermined threshold; and
- if the readings of temperature, humidity, volume and pressure (or hum) are indicative of the gas sample being of human origin, i.e. if the gas sample should be viewed to be a breath sample The predetermined threshold is a matter of choice for the jurisdiction of interest, and varies with the permitted BAC in that jurisdiction and assumed partition ratios. In the United States, for example, the predetermined threshold would be set at 0.08 grams of alcohol per deciliter of blood.

In the event of a reading at or in excess of a predetermined threshold, the gas sampler disables itself for a predetermined period of time and the controller makes a suitable log entry.

Persons of ordinary skill are readily capable of manufacturing gas samplers of this type, and as such, details are neither required nor provided herein.

Alarm

The computing device 42 monitors the signals sent by the gas sampler 36 and, in the event that, within a predetermined period following the prompt, the gas sampler 36 does not receive and analyze a gas sample, an alarm state of the vehicle is triggered. At all times when the vehicle is in the operable configuration in the alarm state, the fail light 51 and tone generator 43 are activated. At all times when the vehicle is in motion in the alarm state, the siren 38 is actuated. The alarm state is also triggered after a gas sample has been provided which, on analysis, reveals alcohol concentration at or above the predetermined threshold. The alarm state is deactivated on receipt of a gas sample or if the vehicle is switched into the inoperable state.

Enablement

The computing device 42:
i) otherwise than within a predetermined period following an engine stall, as determined by OBD monitoring, disables the vehicle automatically upon entry into the operable state associated with the partial-turn position of the key;
ii) disables the vehicle automatically on receipt of a gas sample by the gas sampler 36, as determined through monitoring of the signals produced by the gas sampler 36;
iii) enables the vehicle on receipt of a gas sample which, on analysis, is viewed to be a breath sample and which reveals alcohol concentration below the predetermined threshold; and
iv) disables the vehicle automatically on entry into the alarm state.

Disablement (i) occurs through appropriate actuation of the relay 44 in the starter circuit, i.e. when the key 24 is inserted and partially turned, the starter relay 44 is disabled.

Disablement (ii) occurs through the arming of a lock-out subroutine, specifically, the subroutine sends a signal to the immobilizer circuit 34. To clarify, on receipt of a gas sample by the gas sampler 36, a signal is sent to the immobilizer circuit 34 to incrementally reduce flow to the fuel pump. This state is signaled to the operator of the vehicle by illumination of warning light 46. The rate of reduction is a function of vehicle location and vehicle speed. For example, in a heavily populated area, where a driver can spend a relatively long time going a relatively short distance while encountering a relatively large number of pedestrians and other drivers, a reduction to nil occurs substantially immediately. In contrast, in a lightly populated area, the reduction occurs relatively slowly and to an amount which enables the vehicle to travel only at very low speeds.

Enablement (iii), i.e. following the delivery of a satisfactory breath sample to the device, involves an enablement of the starter relay 44, a disarming of the lock out subroutine by controller 42, a darkening of any illuminated prompt 45, warning 46 and fail 51 lights, and a silencing of the tone generator 43 and siren 38.

Disablement (iv) occurs through the arming of a lock-out subroutine, specifically, the subroutine sends a signal to the immobilizer circuit 34. To clarify, in the alarm state, a signal is sent to the immobilizer circuit 34 to incrementally reduce flow to the fuel pump. This state is signaled to the operator of the vehicle by illumination of fail light 51. The rate of reduction is a function of vehicle location and vehicle speed. For example, in a heavily populated area, where a driver can spend a relatively long time going a relatively short distance while encountering a relatively large number of pedestrians and other drivers, a reduction to nil occurs relatively quickly. In contrast, in a lightly populated area, the reduction occurs relatively slowly and to a de minimis amount which enables the vehicle to travel at very low speeds.

Reset

When the vehicle is turned to the inoperable state, any active alarm state is vacated.

Safety

The foregoing provides an interlock arrangement that has public safety advantages:
- in order to start the vehicle, except in a predetermined period following an engine stall, a satisfactory breath sample must be provided; this minimizes the likelihood of an intoxicated person gaining access to the road;
- once the vehicle has been started, the operator is periodically prompted to provide a breath sample. The device does not enable the sample to be given until the vehicle has been brought to rest, avoiding the attendant risk associated with the delivery of a sample while in motion. The visual and audio prompt increases in intensity over time, to encourage the driver to provide a sample. In the event that the requisite sample is not provided promptly [which might occur if the driver was drinking while driving and was reluctant to give a sample] an alarm state is entered. When the vehicle is in motion in the alarm state, a siren is activated to draw outside attention to the vehicle, improving public safety and heightening the likelihood of intervention by law enforcement personnel. As well, in the alarm state, the vehicle is disabled: in heavily populated areas, full disability occurs relatively quickly; in lightly populated areas, disability occurs more slowly and is only partial, allowing the vehicle to be put into low-speed motion unless the vehicle is brought to rest for a predetermined period of time, in which event it is fully disabled;
- at the roadside, once a sample has been given, the vehicle is disabled, unless the breath sample is satisfactory in terms of alcohol concentration. The level of disability varies with the location of the vehicle. In heavily populated areas, where the operator can be expected to be able to find assistance if required, the vehicle is substantially fully disabled and incapable of motion. In remote areas, where the operator might suffer injury, the vehicle can be driven at low speed, unless the vehicle is brought to rest for a predetermined period of time, in which event it is fully disabled.

Whereas but a single exemplary embodiment is described, numerous variations are possible.

For example, whereas in the exemplary embodiment, the device is for use with a vehicle having a mechanical key actuator, other actuation devices, such as RFID fobs and digital keypads, are contemplated.

As well, whereas in the exemplary embodiment, a siren is provided, which is triggered on motion of the vehicle in the alarm state, it is possible for the alarm state to trigger one or more of: the siren; lights carried by the vehicle; and the horn of the vehicle, with suitable modifications to the control circuits.

Further, whereas in the exemplary embodiment, the alarm state activates an immobilizer circuit, it is possible for the alarm state to interfere with motion of the vehicle by interaction with other systems, such as the brake sensor or OBD-II port.

Further, whereas in the exemplary embodiment, the interlock device assesses motion of the vehicle through the OBD-II port, the device could alternatively assess vehicle motion through other mechanisms, including but not limited to:
  a speedometer of said vehicle;
  the GPS device;
  an internal accelerometer;
  an inertia sensor;
  cellular telephonic signal triangulation; and
  a park sensor of said vehicle.

Additionally, whereas a fuel cell sensor is described, other sensors such as but not limited to infrared sensors, could be utilized.

As well, whereas in the exemplary embodiment indicated, the sensor is an analog sensor capable of providing an indication of alcohol concentration in air, the sensor could be of a binary type, and capable only of determining if the predetermined threshold had been exceeded. In this regard, in many jurisdictions, the predetermined threshold is that which is indicative of the presence of BAC in excess of 0.08 grams alcohol per deciliter of blood.

Moreover, though the disclosure heretofore has largely focused on contexts in which alcohol consumption is of interest, it should be understood that the embodiments of the present invention are applicable to other types of controlled substances as well, such as, for example, a narcotic drug (e.g., cocaine, heroin or marijuana). In such cases, appropriate detection equipment would be interfaced with an interlock in a vehicle or other machinery and could preferably operate in substantially similar manner as the inventive equipment described heretofore in connection with alcohol.

Additionally, whereas various specific types of interlock arrangements are described herein, modifications are possible. For example, whereas the exemplary embodiment utilizes a relay in the starter solenoid circuit for disablement at start-up, the relay could be disposed in the ignition circuit itself, or in any other circuit that must be triggered in order to trigger the ignition circuit. Alternatively, the immobilizer circuit could be used for disablement at start-up. As well, whereas the immobilizer circuit described is interposed in the fuel pump circuit, this is not necessary.

As well, whereas a specific motor vehicle is described, it will be emphasized that this vehicle forms no part of the invention. The present invention can be used with motor vehicles that do not have starter motors, for example, electric vehicles, and with vehicles that do not have 'ignition circuits', for example, diesel vehicles. In the case of a vehicle lacking a starter, for example, an electric vehicle, disablement (i) occurs through the issuance of suitable signals to the motor controller. In addition to automobiles, the invention can be used with, for example, buses, transport trucks, motorcycles and trains.

Further, whereas an 'aftermarket' device is arguably implied in this document, it should be understood that in this description and in the accompanying claims, the vehicle with which the interlock is used and the interlock device could be defined by a vehicle having an OEM interlock installed, with the interlock device and the balance of the vehicle being inoperable and incomplete except with one another.

As well, whereas in the exemplary embodiment, the gas sampler is adapted merely to assess through crude measurements of temperature, etc. whether the sample has been provided by a person, rather than, for example, a machine or a balloon, additional functionality could and would likely be added, for greater utility. Conventional "hum" sensors could, for example, be employed, to further ensure that the gas sample was of human origin; devices for recording attempts by the user to start the vehicle while intoxicated could be added, as is desirable in some jurisdictions; and various recorders and identification methodologies could be employed, to assist in the identification of the person providing the sample.

Further, whereas in the exemplary embodiment described, various enablement and disablement states are specified, it will be understood that these are functional concepts, only. Thus, whereas it is described that the vehicle is disabled automatically on receipt of a gas sample by the gas sampler 36, it will be understood that this could be a positive disablement, i.e. sending a trigger to disable the vehicle on receipt of a gas sample or a negative disablement, i.e. sending a trigger which maintains a previously-created disabled state of the vehicle.

Further, whereas the exemplary embodiment contemplates that prompts will occur at all times when the vehicle is running (or, in the case of an electric vehicle, when the vehicle is in the operable state), the periodic generation of the prompt may be suppressed while the vehicle is assessed to be at rest.

In view of these and other changes, it should be understood that the invention is to be limited only by the accompanying claims, purposively construed.

The invention claimed is:

1. Apparatus for use with a motor vehicle, the apparatus comprising: an interlock device, the interlock device being adapted to, in use: at least while said vehicle is in motion, periodically generate a prompt; assess motion of said vehicle; only when said vehicle is assessed by said device to be at rest, carry out an analysis operation wherein a breath sample is received and analyzed; and in the event that, within a predetermined period following a prompt, the device does not, while said vehicle is assessed to be at rest, carry out said analysis operation, enter an alarm state in which one or more of the following are actuated at least when the vehicle is in motion: lighting forming part of the vehicle; auxiliary lighting carried by the vehicle; the horn of the vehicle; auxiliary horn carried by the vehicle; an event recording circuit; and an immobilizer circuit.

2. Apparatus according to claim 1, wherein, when in use with a vehicle having an internal combustion engine, the device is adapted to block the engine against starting except within: a predetermined period following an analysis operation which has resulted in a finding of breath alcohol concentration below a predetermined limit; and a predetermined period following an engine stall.

3. Apparatus according to claim 2, wherein, following an analysis operation which has resulted in a finding of breath alcohol concentration at or above the predetermined limit, the alarm state is entered.

4. Apparatus according to claim 1, wherein, when in use with an electric vehicle that is user-selectable between an operable state in which the vehicle is capable of being put into motor-driven motion and an inoperable state in which the vehicle is incapable of being put into motor-driven motion, the device is adapted, on entry into the operable state from the inoperable state, to block motor-driven motion of the vehicle otherwise than in a predetermined period following an analysis operation which has resulted in a finding of breath alcohol concentration below a predetermined limit.

5. Apparatus according to claim 4, wherein, following an analysis operation which is has resulted in a finding of breath alcohol concentration at or above the predetermined limit, the alarm state is entered.

6. Apparatus according to claim 5, wherein the analysis operation can result in a finding of breath alcohol below the predetermined limit only when the gas sample is determined by the device to originate from human breath.

7. Apparatus according to claim 6, wherein the determination of human breath origin is based on one or more of: a hum sensor; a measurement of humidity; a measurement of pressure; a measurement of temperature; and a measurement of volume.

8. Apparatus according to claim 1, wherein the interlock device assesses motion of said vehicle in use via one or more of: the on-board diagnostic system of the vehicle; a speedometer of the vehicle; a GPS device; an internal accelerometer; an inertia sensor; cellular telephonic signal triangulation; an odometer of the vehicle; the vehicle speed sensor; an earth gravitational sensor; and a park sensor of the vehicle.

9. Apparatus according to claim 1, wherein the event recording circuit is actuated in the event of receipt of a gas sample which is determined to have an alcohol concentration at or above a predetermined limit.

10. Apparatus according to claim 9, wherein the event recording circuit (i) records the date and time at which the alarm state was triggered; and/or (ii) sends, by wireless means, a message outlining the date and time at which the alarm state was triggered.

11. Apparatus according to claim 2, wherein, when in use with a vehicle having a combustion engine, said periodic prompt generation occurs during times when the engine is running.

12. Apparatus according to claim 4, wherein, when in use with an electric vehicle that is user-selectable between an operable state in which the vehicle is capable of being put into motion and an inoperable state in which the vehicle is incapable of being put into motion, said periodic prompt generation occurs during times when the vehicle is in the operable state.

13. Apparatus according to claim 3, wherein the immobilizer circuit is activated when the vehicle is in the alarm state.

14. Apparatus according to claim 1, wherein the periodic generation of the prompt may be suppressed while the vehicle is assessed to be at rest.

* * * * *